United States Patent
Unger et al.

(10) Patent No.: US 8,073,441 B1
(45) Date of Patent: Dec. 6, 2011

(54) LOCATION-BASED NETWORK SELECTION METHOD FOR A MOBILE DEVICE

(75) Inventors: Ronald Unger, Dallas, TX (US); Mesut Guven, Allen, TX (US); Edward Chao, Plano, TX (US)

(73) Assignee: MetroPCS Wireless, Inc., Richardson, TX (US)

( * ) Notice: Subject to any disclaimer, the term of this patent is extended or adjusted under 35 U.S.C. 154(b) by 0 days.

(21) Appl. No.: 12/862,444

(22) Filed: Aug. 24, 2010

(51) Int. Cl.
*H04W 4/00* (2009.01)
*H04W 24/00* (2009.01)
*H04M 11/04* (2006.01)

(52) U.S. Cl. ............... 455/422.1; 455/435.2; 455/404.2; 455/456.1

(58) Field of Classification Search ............... 455/404.2, 455/422.1, 435.2, 456.1, 456.5
See application file for complete search history.

(56) References Cited

U.S. PATENT DOCUMENTS

| | | | |
|---|---|---|---|
| 5,943,619 A | 8/1999 | Coyne et al. | |
| RE38,267 E | 10/2003 | Borkowski et al. | |
| 6,748,217 B1 * | 6/2004 | Hunzinger et al. | 455/435.2 |
| 6,985,723 B2 | 1/2006 | Kil | |
| 7,069,026 B2 | 6/2006 | McClure | |
| 7,200,383 B2 | 4/2007 | Eronen | |
| 7,224,987 B1 | 5/2007 | Bhela et al. | |
| 7,266,395 B2 | 9/2007 | Schnurr | |
| 7,640,008 B2 | 12/2009 | Gallagher et al. | |
| 2002/0160745 A1 | 10/2002 | Wang | |
| 2003/0036392 A1 * | 2/2003 | Yukie | 455/461 |
| 2004/0067773 A1 * | 4/2004 | Rachabathuni et al. | 455/560 |
| 2005/0153691 A1 | 7/2005 | Xue et al. | |
| 2006/0079224 A1 | 4/2006 | Welnick et al. | |
| 2007/0223408 A1 * | 9/2007 | Thielke et al. | 370/310 |
| 2007/0275717 A1 * | 11/2007 | Edge et al. | 455/434 |
| 2008/0014965 A1 * | 1/2008 | Dennison et al. | 455/456.1 |
| 2008/0268830 A1 | 10/2008 | Sharma et al. | |
| 2009/0086681 A1 * | 4/2009 | Chaturvedi et al. | 370/332 |
| 2010/0150102 A1 | 6/2010 | Li et al. | |
| 2010/0173628 A1 | 7/2010 | Hosain et al. | |

FOREIGN PATENT DOCUMENTS

| | | |
|---|---|---|
| GB | 2271486 A | 4/1994 |
| WO | 9511578 A1 | 4/1995 |
| WO | 9808314 A1 | 2/1998 |
| WO | 2005039115 A1 | 4/2005 |
| WO | 2008125729 A1 | 10/2008 |

OTHER PUBLICATIONS

"RFC2636—Wireless Device Configuration (OTASP/OTAPA) via ACAP" http://www.rfc-editor.org/rfc/rfc2636.txt.

(Continued)

*Primary Examiner* — Michael Thier
(74) *Attorney, Agent, or Firm* — Howison & Arnott, L.L.P.

(57) ABSTRACT

A method for connecting a mobile device with one of a plurality of wireless networks, involves initiating a registration of the mobile device with one of the plurality of wireless networks. A geographic position of the mobile device is determined with respect to at least one of the plurality of wireless networks. A connection is established to one of the plurality of wireless networks responsive to the determined geographic position of the mobile device.

15 Claims, 11 Drawing Sheets

OTHER PUBLICATIONS

Mohanty, S. 2006. A new architecture for 3G and WLAN integration and inter-system handover management. Wirel. Netw. 12, 6 (Nov. 2006). 733-745. DOI= http://dx.doi.org/10.1007/s11276-006-6055-y http://portal.acm.org/beta/citation.cfm?id=1238352.1238360&coll=GUIDE&dl=GUIDE&CFID=96446729&CFTOKEN=90299949&preflayout=flat.

Quintero, A. "A user pattern learning strategy for managing users' mobility in UMTS netw" Mobile Computing, IEEE Transactions on; Issue Date: Nov.-Dec. 2005; vol. 4, Issue:6; pp. 552-566; ISSN: 1536-1233; DOI: 10.1109/TMC.2005.75; http://dx.doi.org/10.1109/TMC.2005.75.

Daniel, K. Tran, T. Wietfeld, C. "IP-Based Overlay Signaling for Seamless Service Roaming in Heterogeneous Networks" Wireless Communications and Networking Conference, Budapest, 2009. WCNC 2009. IEEE; Issue Date: Apr. 5-8, 2009; pp. 1-6; ISBN: 978-1-4244-2947-9; DOI: 10.1109/WCNC.2009.4917763; http://dx.doi.org/10.1109/WCNC.2009.4917763.

Nirmala Shenoy. 2005. A framework for seamless roaming across heterogeneous next-generation wireless networks. Wirel. Netw. 11, 5 (Sep. 2005), 757-774.; http://portal.acm.org/beta/citation.cfm?id=1160075.1160085&coll=DL&dl=ACM&CFID=96446729&CFTOKEN=90299949&preflayout=flat.

* cited by examiner

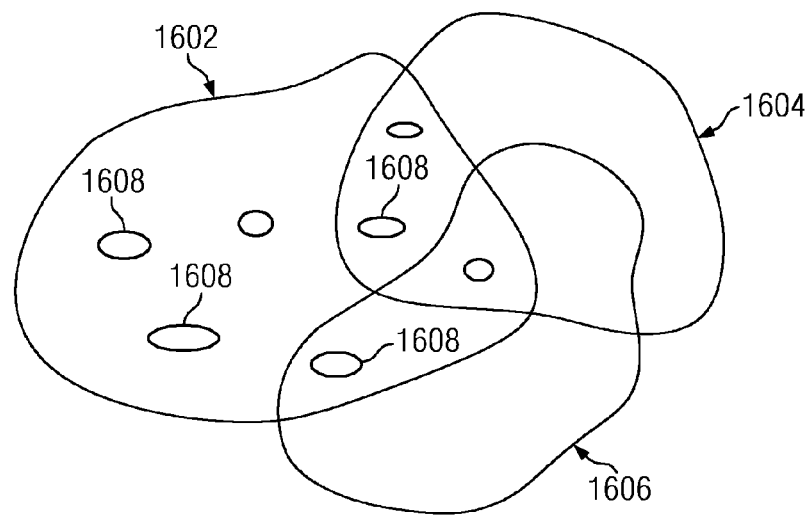
FIG. 16
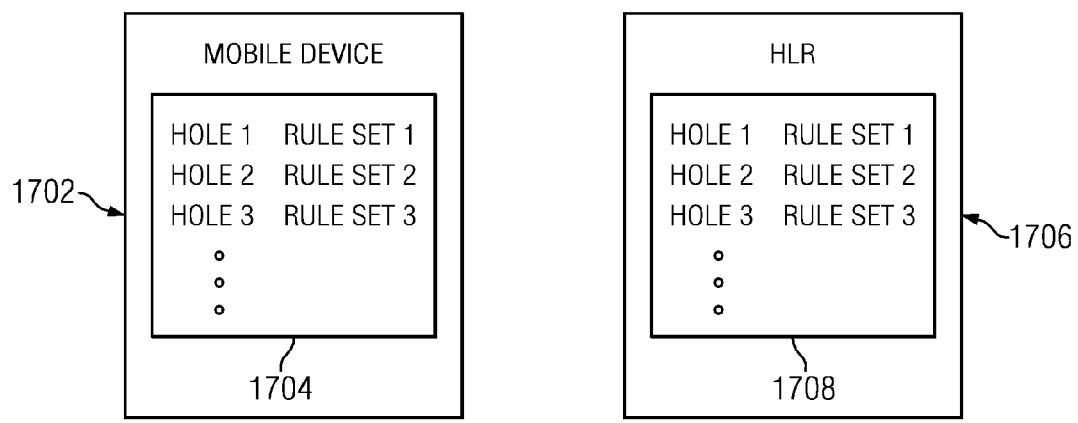
FIG. 17a          FIG. 17b

LOCATION-BASED NETWORK SELECTION METHOD FOR A MOBILE DEVICE

TECHNICAL FIELD

The present invention relates to the selection, provisioning and related control of one or more networks for connection to one or more mobile devices, and more particularly, to the selection of networks for connection with a mobile device based upon a profile defining for example the geographic location of the mobile device with respect to a network.

BACKGROUND

A mobile device such as a mobile telephone, pager, PDA, or any wireless device has one or more home networks with which the mobile device will normally connect. Within a home network, the mobile device is able to obtain services based upon a monthly fee structure with or without a use-based fee structure. When leaving any of their home networks, the user loses the ability to make calls using their mobile device. In order to overcome this problem, the network providers have entered into various roaming agreements. Roaming agreements enable a user from one network to visit other networks and still obtain connectivity for their mobile device even when they are located outside of their home network (i.e., roaming). In order to provide connectivity over large areas of the country, outside of a user's home network, home network providers often have a number of roaming agreements with a variety of different networks over the entire country. This requires the implementation of a preferred roaming list (PRL) within a given system, or similar type of priority list within other types of wireless systems, within the mobile device that provides the mobile device with a priority order for connecting to various roaming partners of the home network provider.

When attempting to register with a network to provide connectivity to the mobile device, the mobile device initially determines the signal strength of all of the networks within the range of the mobile device. If the home network is providing sufficient signal strength, the mobile device will connect with the home network and provide calls and connectivity through the home network. However, in a situation wherein the home network is unable to provide sufficient signal strength to the mobile device, the mobile device determines the roaming partner of the home network to which the mobile device should connect. To do this, the mobile device will examine the preferred roaming list and select the roaming partner having the highest priority on the preferred roaming list that has sufficient signal strength for connecting with the mobile device.

One problem that may arise within a particular home network area is that various roaming partners with which the home network has a roaming agreement may have their own networks overlapping the home network. Thus, if for any reason the home network includes poor coverage areas or temporary decreases in signal quality, a situation may arise wherein the mobile device may connect with a roaming partner's network even though the mobile device is currently within its home network due to the poor signal strength of the home network. This causes the home network provider or the mobile device user to incur roaming charges even though the mobile device is located within its home network. Thus, it would be desirable to provide some manner for limiting the access to roaming partner networks when a mobile device is currently located within its home network. This will save money to the network provider or the mobile device user by limiting unnecessary roaming charges.

SUMMARY

The present invention as disclosed and described herein, in one aspect thereof comprises a method for connecting a mobile device with one of a plurality of wireless networks, involves a mobile device initiating a system selection process with one of the plurality of wireless networks. A geographic position of the mobile device is determined with respect to at least one of the plurality of wireless networks. A connection is established to one of the plurality of wireless networks responsive to the determined geographic position of the mobile device.

BRIEF DESCRIPTION OF THE DRAWINGS

For a more complete understanding, reference is now made to the following description taken in conjunction with the accompanying Drawings in which:

FIG. 16 illustrates a number of overlapping home and roaming networks wherein the home network includes a number of coverage holes therein;

FIG. 17a illustrates a number of rule sets associated with particular holes within in a home network stored within a mobile device;

FIG. 17b illustrates a number of rule sets associated with particular holes within a home network stored within the HLR of the mobile device;

DETAILED DESCRIPTION

Figure 1:
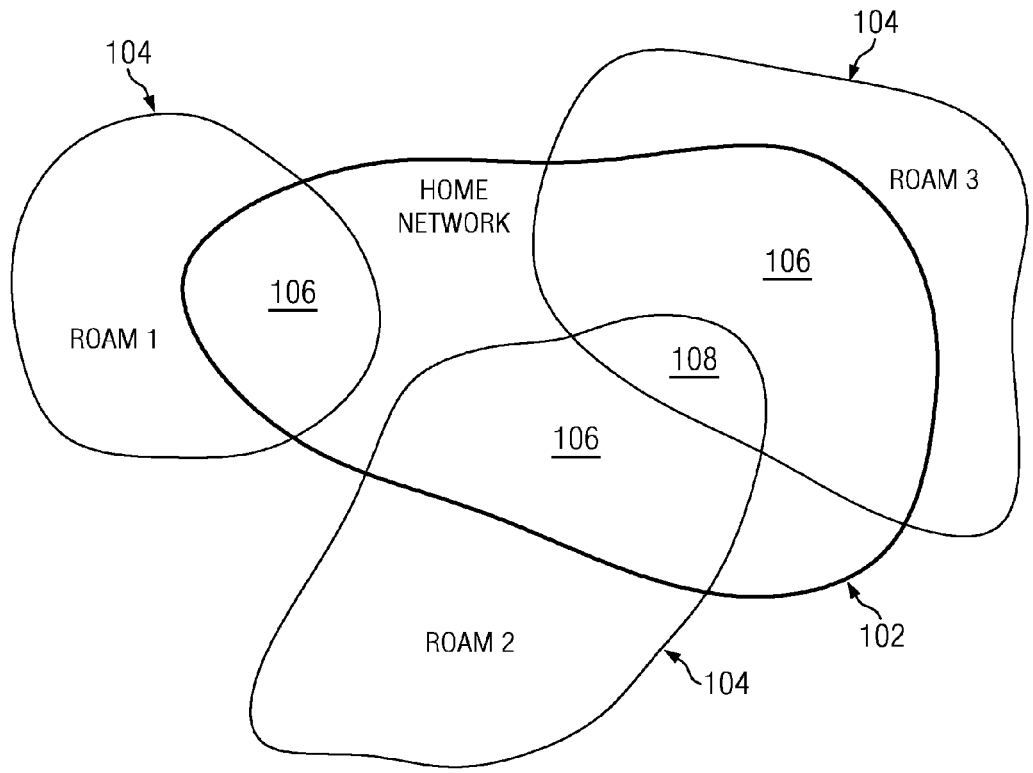
FIG. 1 illustrates the manner in which roaming partner networks may overlap a home network.

Referring now to the drawings, wherein like reference numbers are used herein to designate like elements throughout, the various views and embodiments of location-based network selection method for a mobile device are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated a home network 102 and a plurality of roaming networks 104. The home network 102 is the home operating area where a mobile device (mobile telephone, PDA, pager, or other wireless device) may access network services according to its standard charges. When exiting its home network 102, the mobile device may be provided services within one of the roaming networks 104. As can be seen within the illustration of FIG. 1, the home network has three different roaming networks 104 associated therewith. These networks comprise Roam 1, Roam 2 and Roam 3. Each of the roaming networks 104 includes a first portion that lies outside of the home network 102 and a second portion that overlaps a portion of the home network 102. In some implementations the roaming network 104 could be completely within the home network 102 or completely encompass home network 102. When a mobile device is located within one of the areas 106 that encompass both the home network 102 and a roaming network 104, the mobile device could receive service from each of the home network 102 or the roaming network 104. There is even a situation in the area 108 where a mobile device could receive services from either the home network 102 or one of two roaming networks 104.

In normal circumstances, a mobile device located within its home network 102 will receive services only from the home network 102. However, unique operating conditions within the home network 102 may cause the signal strength to drop below a pre-selected level causing the mobile device to connect with one of the overlapping roaming networks 104 rather than the home network 102. Thus, the mobile device is roaming in a situation when it is actually physically located within its home network 102 but has or should have the ability to connect with the home network 102. This creates undesirable roaming charges to either a network provider of the services to the mobile device or to the user of the mobile device.

Figure 2:
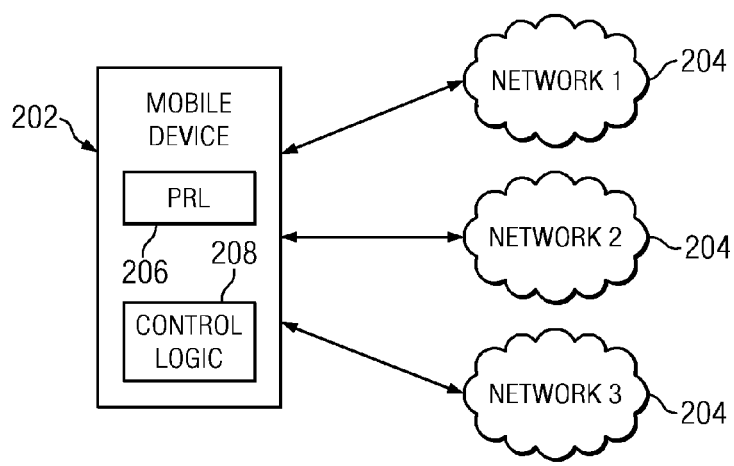
FIG. 2 illustrates a mobile device which may access a number of associated networks based upon a preferred roaming list.

Referring now to FIG. 2, there is illustrated a mobile device 202 which may wirelessly connect to a number of associated networks 204. The networks 204 may comprise a home network or a roaming network as described previously with respect to FIG. 1. The mobile device 202 determines how to interconnect with one of the networks 204 and based upon a priority roaming list 206 and internal control logic 208. When a mobile device 202 is in a roaming mode of operation, the mobile device initially utilizes the control logic 208 to scan for each of the available roaming networks 204. Once the mobile device knows each of the available roaming networks 204, the mobile device 202 accesses a priority roaming list 206 to determine which of the networks 204 the mobile device should first attempt to access. The determination made by the control logic 208 as to which network to access on the priority roaming list 206 can be based on the priority order of the networks that is established within the priority roaming list 206 and the networks 204 having required signal strength characteristics to provide connectivity with the mobile device 202. However, it may be that the initial scan just did not recognize the home network 102 even though it was within the service area. This could be due to any number of factors.

Presently available network selection methods used by wireless devices may rely upon the creation of virtual geographic boundaries for the network by grouping several network identifying parameters (referred to as GEOs in CDMA systems) and defining a geographic area based upon where these grouped parameters are received. For example, in a 3GPP2 (CDMA) network, these identifying parameters are the SID (system ID) and the NID (network ID). Within a 3GPP (GSM) network, the network identifiers may consist of the MCC (mobile country code), the MNC (mobile network code) and the cell ID. Each of these network identifiers has a particular geographic area that is associated therewith. Thus, if a mobile device 202 is receiving a particular combination of parameters, the mobile device 202 can analyze these parameters and assume they are within a particular virtual geographic boundary. Thus, when a mobile device 202 acquires a network broadcasting a particular combination of parameters, the mobile device 202 will create a database that combines these parameters into a group and assigns relative priorities to the networks within a given GEO. If a mobile device resides within more than one GEO, a preference is given to network GEOs that the handset is located within.

A problem with the above-described method is that the mobile device 202 does not know the exact geographic location of the mobile device within a given network. The mobile device 202 only knows to assign relative priorities within a given GEO based upon how the carrier provider has designed the preferred roaming list table. In fact, some combinations of parameters can be reused within other GEOs defined within the preferred roaming list to provide the handset with a different group of priorities. Thus, the mobile device will by default acquire the next highest priority system within a given GEO if the higher priority system is unavailable. For example, within the Dallas/Fort Worth area, if a customer loses their home network signal perhaps due to a coverage hole or weak signal (even though it is within the service area), the mobile device will automatically rescan for the next best network and attempt to register with that network. If the next network within the priority list is a valid roaming partner of the home network, the registration will be successful and the mobile device will be allowed to connect. The problem with this method is that roaming charges will be incurred with respect to the mobile device even though it is located within an area in which the mobile device has home network coverage.

Figure 3:
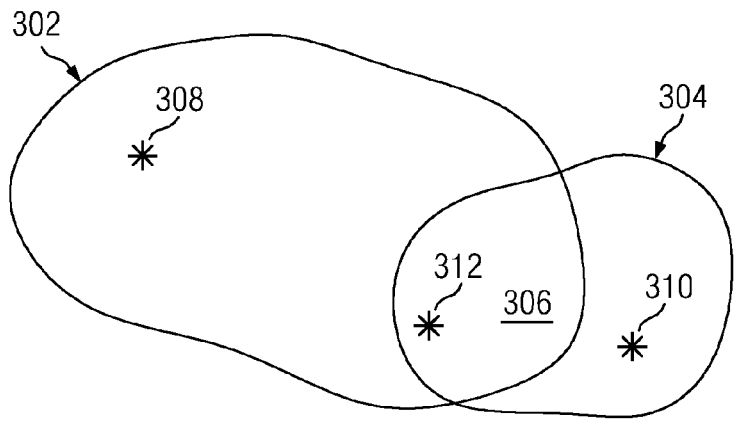
FIG. 3 illustrates the manner in which a mobile device may determine its location to determine which network to connect to between an overlapping home network and roaming network.

Referring now to FIG. 3, there is illustrated an example wherein the home network 302 of a mobile device and the roaming network 304 of a roaming network partner of the home network provider overlaps in an area 306. In this situation, when a mobile device is located in the area indicated generally at 308 no problem will occur as the mobile device solely resides within a coverage area provided by the home network 302, and the mobile device would register with the home network 302. Similarly, if the mobile device was at the location indicated generally by 310, the mobile device would register with the roaming network 304, as it resided within an area solely provided coverage by the roaming network 304.

The problem arises when the mobile device is in the location indicated generally at 312. In this case, the mobile device is within the area 306 that is provided overlapping coverage by the home network 302 and the roaming network 304. Conceivably, the mobile device could acquire either of the home network 302 or the roaming network 304. The service provider of the home network 302 would prefer for the mobile device to register within the home network 302 when within the area 306 because this would prevent the home network provider or the user of the mobile device from incurring roaming charges from the roaming network provider even though home network coverage could be provided at location 312. In order to provide this type of connection bias to the home network 302 when the mobile device is located within the overlapping coverage area 306, a bias to the home network can be provided by basing the determination of which network to register with upon not only signal strength and the priority roaming list, but also the geographic location of the mobile device. Thus, the mobile device would additionally utilize a determination of its geographic location at position 312 along with knowledge of the boundaries of the coverage area provided by the home network 302. Utilizing this information, the mobile device determines whether its present location is within the geographic boundaries of the home network 302 and selects a connecting network accordingly. Once such is determined, repeated scans can be made in an attempt to connect with the home network 102.

Figure 4:
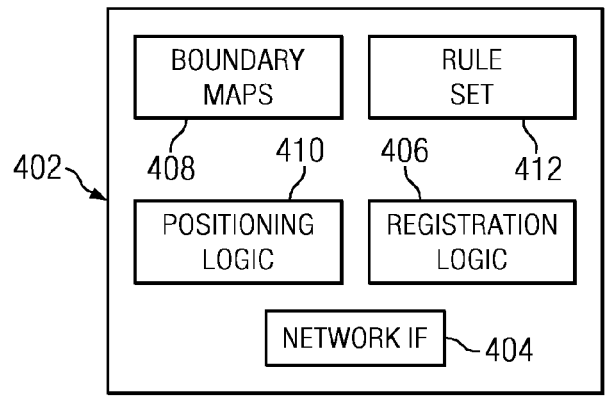
FIG. 4 is a functional block diagram of a mobile device for selecting a connecting network based upon a present location of the mobile device with respect to the geographic boundaries of its home network.

Referring now to FIG. 4, there is provided a functional block diagram of a mobile device 402 including the functional elements necessary for registering with a network utilizing the location-based process described herein. Registration involves the mobile device 402 scanning for available networks, selecting network for connection and transmitting the necessary registration information to register the mobile device 402 to operate within the selected network. The mobile device 402 includes a network interface 404 to enable the mobile device 402 to wirelessly connect to the home network and any number of various roaming networks. The network interface 404 provides the wireless connection hardware and software protocols for communicating with a particular wireless network such as a GSM network, CDMA network, 3G network, 4G network, etc. The registration logic 406 provides the necessary protocols for registering the mobile device 402 with the network that is acquired. The registration logic 406 provides for the selection, provisioning and control of a network for connection to the mobile device 402. The registration logic 406 enables the mobile device 402 to register with a network by first scanning for available networks and then transmitting registration information to a network selected for connection. The mobile device registers with the home network by transmitting various identifiers and parameters from the mobile device 402 to the home network enabling the home network to confirm that the mobile device 402 is indeed a subscriber to the home network and allow access to the home network of the mobile device through the network interface 404 after the home network has been detected by an initial scan by the mobile device 402. Additionally, the registration logic 406 enables the mobile device 402 to contact various roaming networks. In the roaming case, similar identification information and registration parameters are transmitted from the mobile device 402 to the roaming network after the mobile device 402 initial scan determines that the home network is not available. The roaming network contacts the home network to determine first that the home network has some type of roaming agreement with the roaming network, and if so, confirms that the information provided from the mobile device 402 indicates that the mobile device is a valid subscriber to the home network. This enables the mobile device to roam within the roaming network and receive wireless communication connectivity.

The mobile device 402 is able to determine its position utilizing stored boundary map information 408 and positioning logic 410. The boundary maps 408 provide information relating to the geographic boundaries of a home network 302. The boundary maps 408 do not provide detailed information on the area within the boundaries of the home network but merely provides information relating to the geographic limits of the coverage area of the home network 302. Thus, utilizing the boundary maps 408 and the positioning logic 410, a mobile device 402 is able to determine its geographic position and determine whether they reside within the geographic boundaries established by the boundary maps 408.

The positioning logic 410 enables the mobile device 402 to determine its geographic position. With the positioning information, the mobile device 402 determines where it resides with respect to the geographic boundaries of its home network 302. The geographic positioning provided by the positioning logic 410 can use any number of determining methods. In one embodiment, a global positioning system (GPS) may be used to determine the geographic location of the mobile device 402. In addition to GPS, other types of network based geographic location methods such as AFLT, cell ID, etc. may be used to determine the geographic position of the mobile device. GPS positioning methods such as direct GPS and assisted GPS (A-GPS) will likely provide the best opportunity for positioning the mobile device 402 as most modern mobile handsets are equipped with GPS receivers and have the ability to provide latitude/longitude information based upon GPS assisted protocols and computations using a GPS receiver as well as terrestrial location methods such as AFLT. Additionally, cell site geographic location information is often included in the overhead messaging during system acquisition. For this case, the positioning logic 410 determines a geographic location of the mobile device 402 based upon knowing the geographic location of the particular cell site to which the mobile device is connected.

A rule set 412 is established for the mobile device 402 to control the manner in which the mobile device 402 connects with the home network 302 and roaming networks 304. The rule set 412 comprises a profile defining the selection, provisioning and control of the mobile device 402 with the available network. The rule set 412 utilizes the location-based information of the mobile device 402 obtained from the positioning logic 410 and the boundary map information obtained from the boundary maps 408 to determine the geographic position of the mobile device 402 with respect to the home network and control which network that the mobile device 402 connects with. The rule set 412 will bias the connection of the mobile device 402 to a home network 302 rather than a roaming network 304. Thus, if the positioning logic 410 and the boundary maps 408 determine that the mobile device 402 is presently located within the boundaries of the home network 302, the rule set 412 will operate in such a fashion that the mobile device 402 will be biased to connect with the home network 302 rather than the roaming network 304. This may be done in a number of fashions that will be described hereinbelow, such as attempting multiple scans of the network(s) in an attempt to recognize the System ID (SID) of the home network 302 by initiating multiple scans to attempt to detect the home network 302 before passing on to selecting and registering with a roaming network 304, by attempting multiple scans to recognize the home network 302 for a particular period of time before selecting and registering with the roaming network 304 and any number of methods in which recognition of the home network 302 comprises the preferred registration result. While a number of different methods for biasing the registration to the home network 302 over the roaming network 304 are described herein, it will of course be realized that any location-based network selection method enabling the registration of the mobile device 402 with a home network 302 or roaming network 304 using location of the mobile device 402, boundary maps of the home network 408 and various rule sets 412 for establishing this connection may be utilized.

Figure 5:
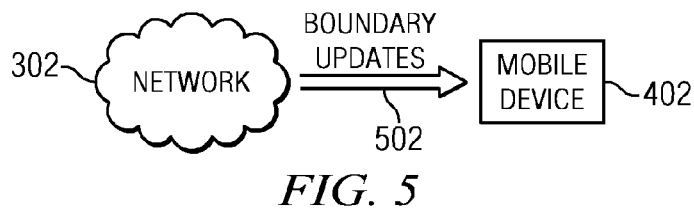
FIG. 5 illustrates the manner in which a home network may periodically update a mobile device with various geographic boundary updates.

Since the network selection method described herein relies upon determining a location of a mobile device 402 with respect to its home network 302, the need for having accurate up-to-date information with respect to the boundary maps 408 stored within the mobile device 402 is necessary. The boundary maps 408 are initially stored within the mobile device 402 at the factory to represent the position of the network boundaries at the time of manufacture of the mobile device 402. Additionally, as illustrated in FIG. 5, the mobile device 402 may receive periodic over-the-air boundary updates 502 from the home network 302. In this case, the home network 302 can periodically transmit information to all mobile devices 402 associated with the home network 302 that certain types of network boundary updates are available. The mobile device 402 determines if it requires the updates and downloads the updates as necessary utilizing over-the-air push technology methods. An alternative user initiated method enables a user to select an option or dial a number to initiate a download of the latest roaming update or could include the updates in roaming list updates that are done for the phone. By utilizing initial preloaded factory boundary maps 408 and periodic over-the-air updates, the boundary maps 408 may be continually updated to provide the mobile device 402 up to the date boundary coverage information. Additionally, the boundary maps could be remotely located such that a remote location would have to be connected to in order to determine the boundaries.

The rule set 412 may be maintained within the mobile device 402 in a similar manner. The initial rule set 412 is stored within the mobile device 402 during factory production. The rule set 412 may be periodically updated within the mobile device 402 from the home network 302 utilizing push or pull technologies that keep the rule sets 412 updated with the current state of the access rules for the home network 302.

An additional method for periodically updating the boundary maps 408 and rule set 412 may utilize removable media such as a UICC card, SIM card, Flash memory card, etc. In this way, rather than doing an over-the-air update to the mobile device 402, the boundary maps 408 and rule sets 412 are periodically updated by inserting a new or updated UICC card, SIM card, Flash memory card, etc. into the mobile device 402. Additionally, the over-the-air update of the mobile device 402 could be done via Wi-Fi connectivity, internet connection or some other type of non-cellular network rather than a cellular network.

Figure 6A:
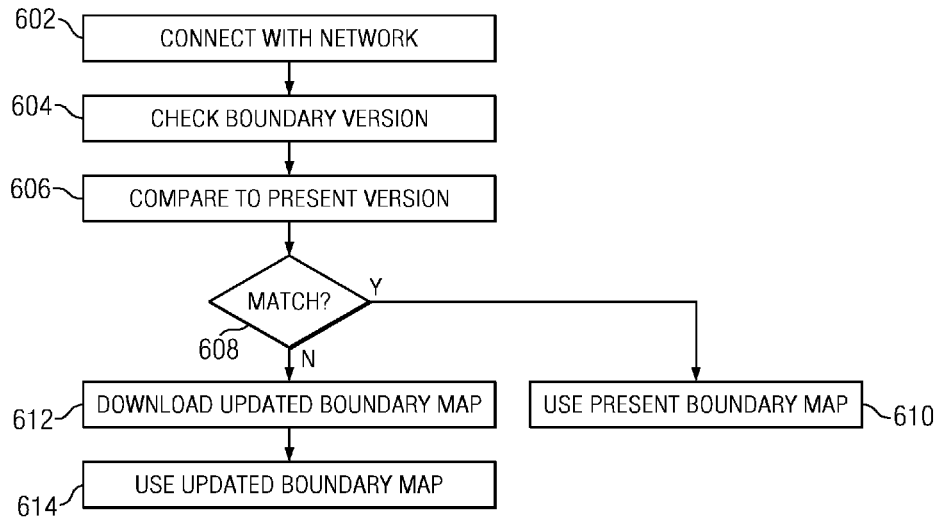
FIG. 6a is a flow diagram describing a device initiated method for periodically updating the geographic boundary maps of a mobile device's home network.

Referring now to FIG. 6a, there is illustrated a user device initiate model for updating the boundary information within the mobile device 402 according to periodic over-the-air updates. The mobile device connects at step 602 with the home network 302 and includes a present version of the boundary information that is either factory installed or updated in an over-the-air fashion. The present boundary map version stored within the mobile device is checked at step 604. This present boundary map version is compared at step 606 with an available over-the-air network boundary map version that is available at step 606. Inquiry step 608 determines if the boundary map version presently stored on the mobile device 402 is the same as the boundary map version that is available from the network. If the versions match, the mobile device 402 continues to use the presently stored boundary map version at step 610. However, if inquiry step 608 determines that an updated boundary map version and the version stored on the mobile device 402 do not match, the updated boundary map is downloaded at step 612 to the mobile device 402. The mobile device 402 utilizes the updated boundary map for location-based decisions at step 614.

Figure 6B:
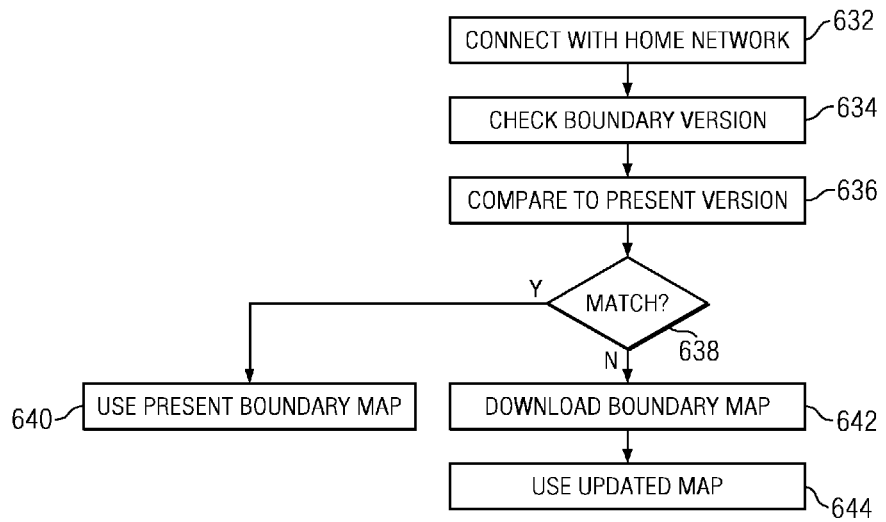
FIG. 6b is a flow diagram describing a network initiated method for periodically updating the geographic boundary maps of a mobile device's home network.

Referring now to FIG. 6b, there is illustrated a network device initiated model for updating the boundary information within the mobile device 402 according to periodic over-the-air updates. The mobile device connects at step 632 with the home network 302 and provides to the network a present version of the boundary information that is either factory installed or previously updated in an over-the-air fashion. The present boundary map version received by the network that is stored within the mobile device is checked at step 634. This present boundary map version is compared at step 636 with an available network boundary map version that is available at the network. Inquiry step 638 determines if the boundary map version presently stored on the mobile device 402 is the same as the boundary map version that is available from the network. If the versions match, the network instructs the mobile device 402 to continue using the presently stored boundary map version at step 640. However, if inquiry step 638 determines that an updated boundary map version and the version stored on the mobile device 402 do not match, the updated boundary map is downloaded at step 642 to the mobile device 402. The mobile device 402 utilizes the updated boundary map for location-based decisions at step 644.

Figure 7:
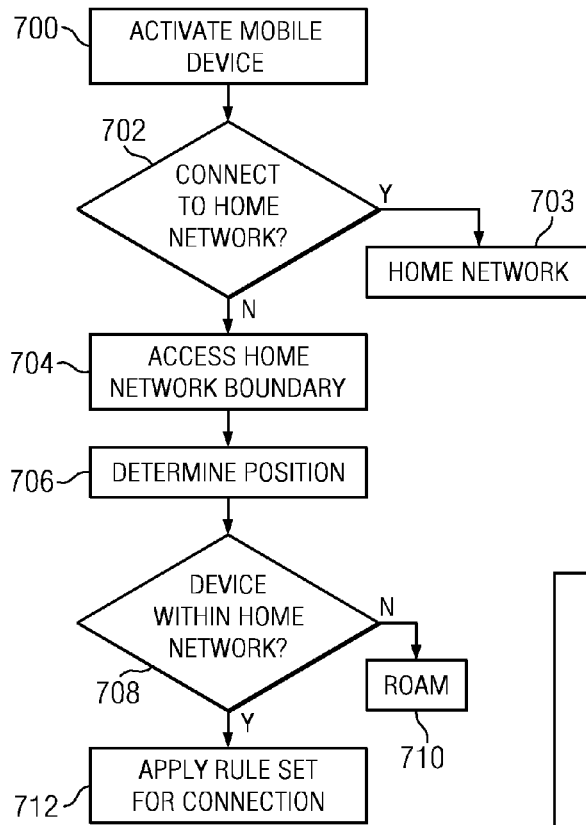
FIG. 7 is a flow diagram illustrating the manner for selecting a connecting network for a mobile device based upon a location of the mobile device.

Referring now to FIG. 7, there is provided a general flow diagram describing the manner in which a mobile device 402 may select a network for connection to the mobile device 402 to provide wireless communications therewith based upon the geographic location of the mobile device 402. The process is initiated at step 700 wherein the mobile device 402 is activated and initiates the network registration process. The mobile device 402 attempts an initial connection with the home network 302, i.e., it scans the network(s) to determine if the home network is present at inquiry step 702. If the home network 302 is available, it will connect with the home network at step 703. If the home network is not initially available, the mobile device 402 will access the home network boundary map information that is stored within the mobile device 402. Next, the mobile device 402 will determine its geographic position utilizing, for example, GPS positioning or some other type of geographic positioning technique at step 706 to determine the geographic location of the mobile device 402. The mobile device 402 determines at inquiry step 708 whether the mobile device 402 is located within its home network 302 based upon the known geographic boundaries of the home network from the boundary maps 408 and the positioning information obtained from the positioning logic 410 in addition to knowing the SID of the home network. If the mobile device 402 does not presently reside within its home network boundaries, the mobile device 402 will be allowed to roam and connect with a roaming network provider at step 710 according to a stored PRL. However, if it is determined that the mobile device 402 presently resides within a home network at inquiry step 708, the mobile device 402 will apply the stored network connection rule set 412 at step 712 to establish a network connection. Rule Set 412 can be comprised of any logic and information available. The rule set used may be based on location, speed, call history, location history, call patterns, time of day, proximity to home boundary, etc. Examples of information are not limited to location, speed, call history, call patterns, time of day, proximity to home boundary, listings of acceptable and unacceptable cell sites, etc. As described previously, these rules will bias the connection of the mobile device to the home network to ensure the maximum likelihood that the mobile device 402 will connect to the home network 302 and prevent the incursion of roaming charges associated with connecting to a roaming network 304.

Figure 8:
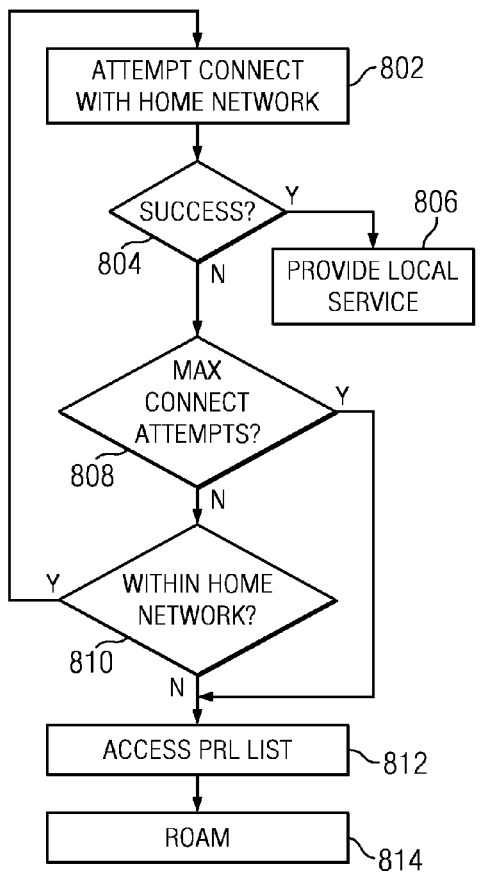
FIG. 8 is a flow diagram illustrating a first embodiment of a rule set for encouraging connection of a mobile device to its home network rather than a roaming network based upon its location.

The rule sets 412 that are implemented within the mobile device 402 may bias the connection of the mobile device 402 to the home network 302 in any number of fashions. Referring now to FIG. 8, there is illustrated one such implementation of the rule set 412. In the embodiment of FIG. 8, the mobile device 402 is required to attempt a certain number of connection attempts with the home network if it is within the home network service area before allowing the mobile device 402 to proceed with connecting to a roaming network 304. The process is initiated at step 802 wherein the mobile device 402 attempts an initial connection with the home network 302, i.e., it scans the network(s) to determine if the home network is present. Inquiry step 804 determines if a successful connection has been established with the home network. If a connection is established, control passes to step 806 and local service is provided to the mobile device 402 via the home network 302.

If inquiry step 804 determines that a successful connection has not been established with the home network, inquiry step 808 determines if a maximum number of connection attempts to the home network have been attempted. If not, control passes to inquiry step 810 to determine whether the mobile device 402 is presently located within the home network 302. If not within the home network 302, control passes to step 812 wherein the mobile device 402 accesses the preferred roaming list to establish a roaming connection with a roaming network. However, if the mobile device 402 is within the home network 302 as determined at inquiry step 810, control passes back to step 802 and another attempt is made to connect with the home network 302.

As long as the mobile device 402 remains within the home network 302, the mobile device 402 will continue attempting to connect with the home network 302 until a maximum number of connection attempts is achieved as determined at inquiry step 808. Once the maximum number of connection attempts has been attempted, control passes from inquiry step 808 to step 812 wherein the mobile device accesses the priority roaming list. This will enable the mobile device 402 to establish a roaming connection at step 814. In this manner, the mobile device network registration is biased to the home network 302 since a predetermined number of attempts are made to connect with the home network 302 before the mobile device 402 is allowed to establish a roaming connection with a roaming network 304.

Figure 9:
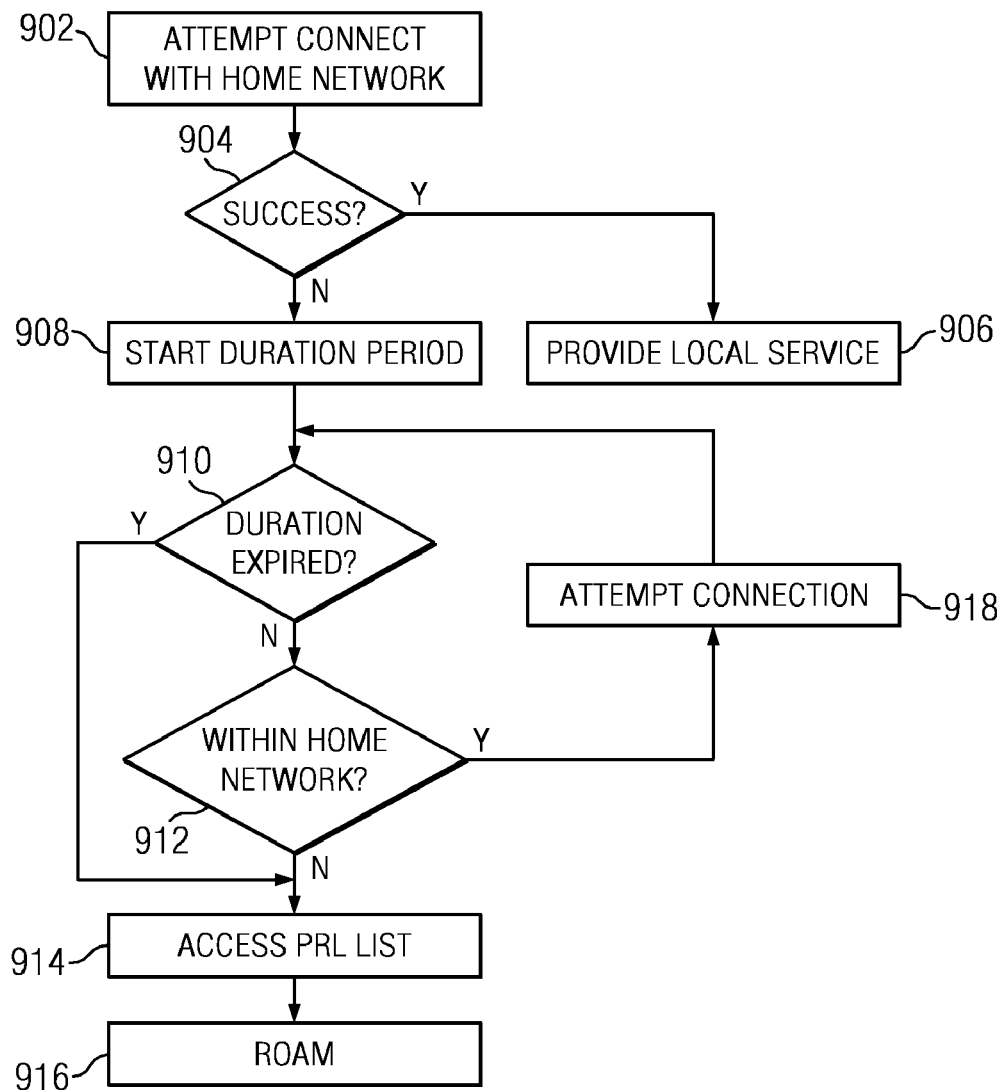
FIG. 9 is a flow diagram describing an alternative embodiment for the rule set for establishing a network connection with a mobile device.

Referring now to FIG. 9, there is illustrated an alternative embodiment of the rule set 412 wherein rather than utilizing a maximum number of connection attempts to determine when to switch from home network connection attempts to roaming connection attempts, a predetermined duration of time is established for trying to connect to a home network. An initial attempt to connect with the home network 302 is made at step 902. Inquiry step 904 determines if the initial connection with the home network was successful. If so, control passes to step 906 and local service is provided via the home network connection at step 906. If inquiry step 904 determines that a successful home network connection has not been established, the determination of a particular duration period is started at step 908. This determination can be made using an internal timer of the mobile device 402 or the mobile device 402 can track timing information received over the over-the-air interface from a communicating cell site.

Inquiry step 910 determines if the monitored time period duration has expired. If the time period has not expired, control passes to inquiry step 912 wherein a determination is made if the mobile device 402 resides within the home network 302. If not within the home network, control passes to step 914, and the mobile device 402 accesses the preferred roaming list prior to establishing a roaming connection at step 916. If inquiry step 912 determines that the mobile device 402 resides within the home network 302, a further connection attempt with the home network is attempted at step 918. Control passes back to inquiry step 910 to determine if the time period duration being monitored by the mobile device 402 has expired. The mobile device 402 will continue to attempt to connect to the home network until inquiry step 910 determines that the monitored time period has expired. Once the monitored time period expires, control passes to step 914 wherein the preferred roaming list is accessed. The mobile device 402 establishes a roaming connection at step 916 with a roaming network 304. In this manner, the connection of the mobile device 402 is biased for connection to the home network 302 rather than the roaming network 304 by requiring the mobile device 402 to attempt to connect to the home network 302 for a predetermined period of time prior to enabling connections with a roaming network 304.

Figure 10A:
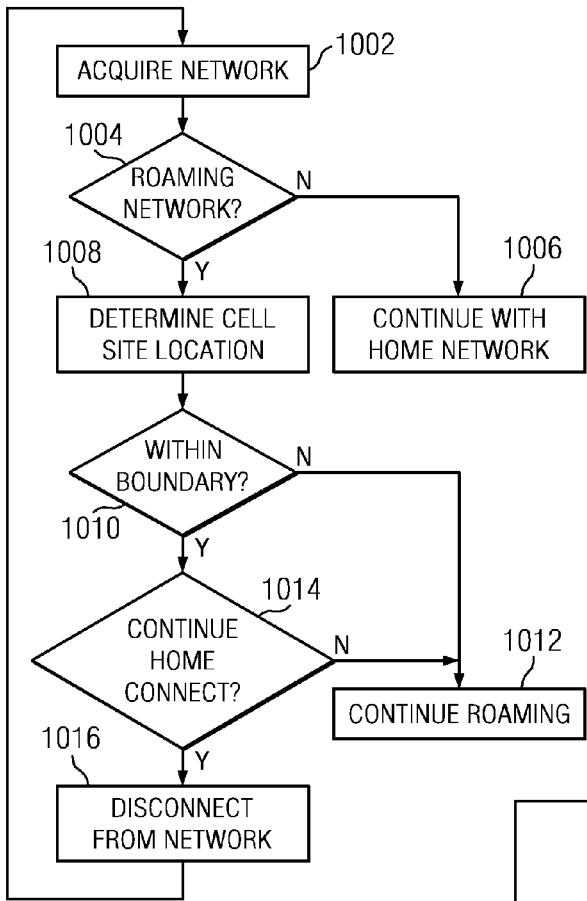
FIG. 10a is a flow diagram illustrating an alternative method for selecting a connecting network for the mobile device wherein the mobile device is positioned based upon the cell site connected to the mobile device.

Referring now to FIG. 10, there is illustrated an alternative implementation of the rule set 412 and positioning logic 410 wherein rather than using a GPS or similar type of positioning logic 410 within the mobile device 402 to determine position, the mobile device 402 determines the geographic position with respect to the home network boundaries based upon the location of the cell site with which the mobile device is communicating. Thus, an initial network acquisition is attempted at step 1002 and inquiry step 1004 determines whether the mobile device 402 is connected with a roaming network 304. If not, the mobile device connects with the home network at step 1006. If the mobile device 402 is attempting to connect with a roaming network 304, a determination is made at step 1008 as to the geographic location of the cell site with which the mobile device 402 is communicating. Inquiry step 1010 determines whether the cell site is within the geographic boundaries of the home network 302. If the cell site is not within the geographic boundary, the mobile device 402 continues connection with the roaming network at step 1012 and continues the roaming process.

If inquiry step 1010 determines that the cell site does reside within the boundaries of the home network 302, inquiry step 1014 determines if the mobile device 402 should continue attempting to connect to the home network. This may be based upon a select number of attempted network connections or a time period for connecting to the home network 302. If inquiry step 1014 determines that the mobile device 402 should not continue attempting to connect with the home network, control passes to step 1012, and the mobile device 402 continues with the roaming network. If inquiry step 1014 determines that home network connections should be further attempted, the mobile device 402 disconnects from the roaming network at step 1016 and attempts to acquire a network via registration at step 1002. The process then repeats. The procedure will continue until a home network connection is established at step 1006 or the mobile device 402 determines that it is OK to continue with the roaming network at step 1012.

Figure 10B:
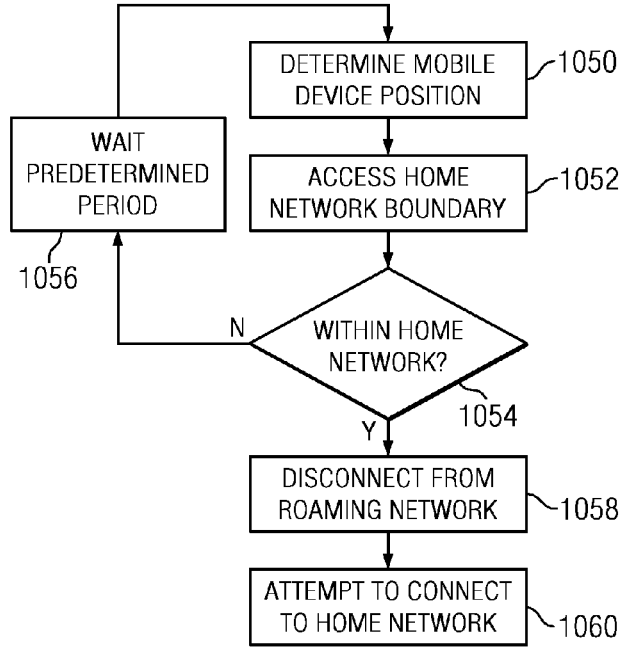
FIG. 10b is a flow diagram describing the manner in which a roaming mobile device periodically determines whether it is within a home network.

When a mobile device 402 is operating within a roaming network, it will periodically check to determine whether the mobile device has entered into its home network. As illustrated in FIG. 10*b*, the mobile device determines its position at step 1050. The mobile device accesses the home network boundary information at step 1052. Utilizing the mobile device position information and the home boundary network information, inquiry step 1054 determines whether the mobile device is presently within the home network. If not within the home network, control passes to step 1056, and the mobile device waits for a predetermined period of time before again determining the position of the mobile station at step 1050. If inquiry step 1054 determines that the mobile device is within its home network, the mobile device disconnects at step 1058 from the roaming network and attempts to connect to the home network at step 1060. The attempted reconnection with the home network while in a roaming network could occur in any of the above-described situations when the mobile device 302 connects with the roaming network such as that referenced in FIGS. 7-10*a*

Figure 11:
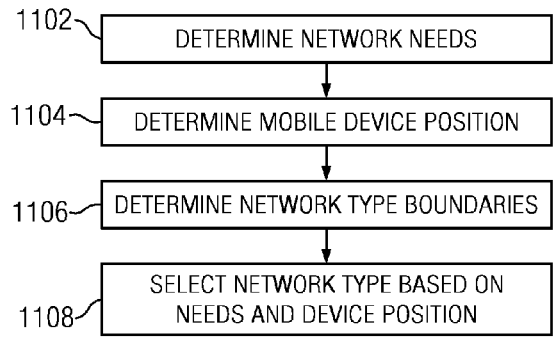
FIG. 11 is a flow diagram illustrating the manner for using mobile device location to determine a type of voice or data network for connecting with a mobile device based upon its location.

In addition to utilizing a position based selection of a roaming versus a home network for a mobile device 402, the location-based selection of a network can be used to select the type of data network to which the mobile device 402 will connect based upon the profile established with the rule set 412. For example, if the mobile device 402 determines that a Wi-Fi network, an LTE network and a CDMA network are each available to the handset, the mobile device may include a rule set which enables the mobile device to select the type of network for providing the connection based upon the location of the mobile device 402 with respect to these networks. Thus, as illustrated in FIG. 11, the mobile device 402 may initially determine at step 1102 the network needs of the mobile device 402 to execute a particular application at step 1102. The position of the mobile device 402 is determined at step 1104 utilizing the positioning logic 410 and boundary maps 408 as described previously. Next, the boundaries of the available network types are determined at step 1106. Thus, in the current example, the available boundaries for the Wi-Fi, LTE and CDMA networks are determined at step 1106 based upon information stored within the boundary maps 408 of the mobile device 402. As discussed previously, the boundary maps for the various network types would have to be pre-stored upon the mobile device 402 and periodically updated via some type of update mechanism.

Finally, a rule set 412 is used to select the particular network type for connection to the mobile device 402 based upon the needs of the applications to be executed by the mobile device 402 and its geographic position with respect to the available network boundaries and the priority is established by the rule set for the available networks at step 1108. Thus, if it was desired for the mobile device 402 to establish connections with LTE networks over Wi-Fi and CDMA networks for a particular application, and a determination is made that the mobile device 402 is actually positioned within an LTE network, the connection to the LTE network can be biased to occur within the mobile device 402 in a manner similar to that described previously with respect to home over roaming networks. This would enable data transmissions within the mobile device 402 to be biased to occur over the most desirable network connections with the mobile device 402.

Figure 12A:
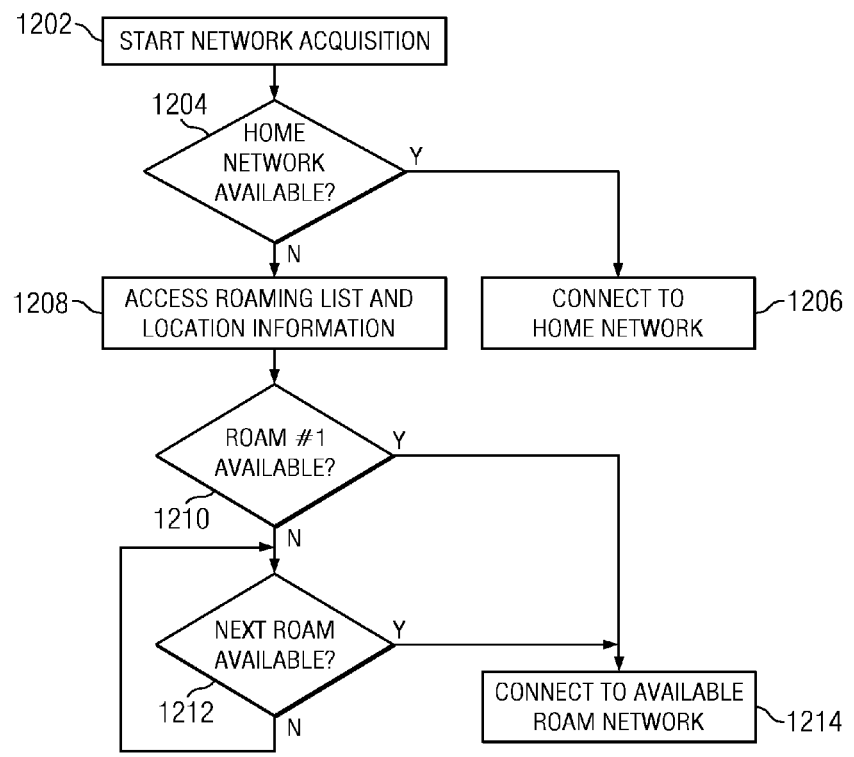
FIG. 12a is a flow diagram illustrating yet a further method for utilizing a positioning of the mobile device to determine which roaming network to access when a home network is not presently available.

In addition to biasing the mobile device 402 to connect to the home network 302 rather than a roaming network 304, the location-based network selection method can also be used to bias the selection of the particular home network or roaming network when multiple home or roaming networks are available to the mobile device 402. Thus, as more fully illustrated in FIG. 12*a* for a roaming network, once the network acquisition process is initiated at step 1202, inquiry step 1204 determines whether the home network 302 is available. If so, the mobile device 402 connects to the home network 302 at step 1206. If inquiry step 1204 determines that the home network is not available, the roaming list of available roaming networks is accessed at step 1208 along with location information for the mobile device 402 with respect to each of the available roaming networks 304 and geographic boundary information for each available roaming network 304. The mobile device 402 accesses the highest selected priority roaming network within which it is presently located and determines at inquiry step 1210 whether the mobile device 402 can connect with the highest priority roaming network based upon location. If so, the mobile device 402 connects with the available roaming network at step 1214. If the initial roaming network is not available, control passes to the next available roaming network at inquiry step 1212 to determine if the next highest priority network based upon location is available. If the network is available, the mobile device 402 connects with the available roaming network at step 1214. If the network is not available, the mobile device 402 will move on to the next roaming network in an attempt to select the highest priority roaming network with which a connection may be established. In this manner, the position of the mobile device 402 may be used to select a most advantageous roaming network for the roaming device.

Figure 12B:
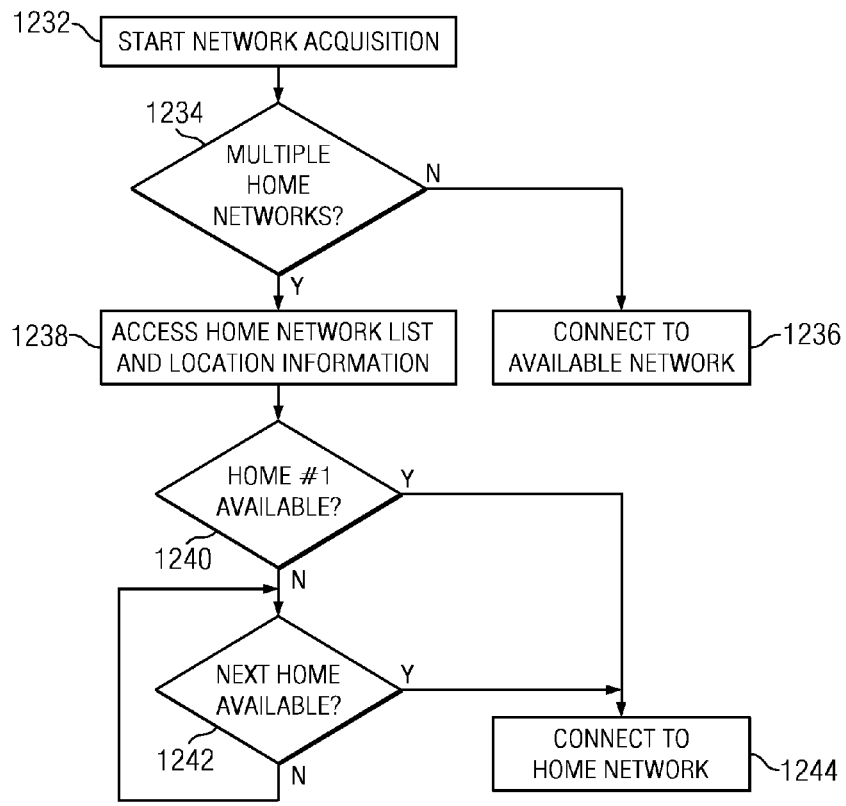
FIG. 12b is a flow diagram illustrating yet a further method for utilizing a positioning of the mobile device to determine which home network to access when multiple home networks are available.

FIG. 12*b* illustrates a method for selecting a preferred home network when multiple home networks are available. Once the network acquisition process is initiated at step 1232, inquiry step 1234 determines whether multiple home networks 302 are available. If not, the mobile device 402 connects to a single home network 302 or a roaming network at step 1236. If inquiry step 1234 determines that multiple home networks are available, the list of available home networks is accessed at step 1238 along with location information for the mobile device 402 with respect to each of the available home networks 302 and geographic boundary information for each available home network 302. The mobile device 402 accesses the highest selected priority home network 302 within which it is presently located and determines at inquiry step 1240 whether the mobile device 402 can connect with the highest priority home network based upon location. If so, the mobile device 402 connects with the available home network 302 at step 1244. If the initial home network 302 is not available, control passes to the next available home network at inquiry step 1242 to determine if the next highest priority network based upon location is available. If the network is available, the mobile device 402 connects with the available home network at step 1244. If the network is not available, the mobile device 402 will move on to the next home network in an attempt to select the highest priority home network with which a connection may be established. In this manner, the position of the mobile device 402 may be used to select a most advantageous home network 302 for the mobile device 402.

Figure 13:
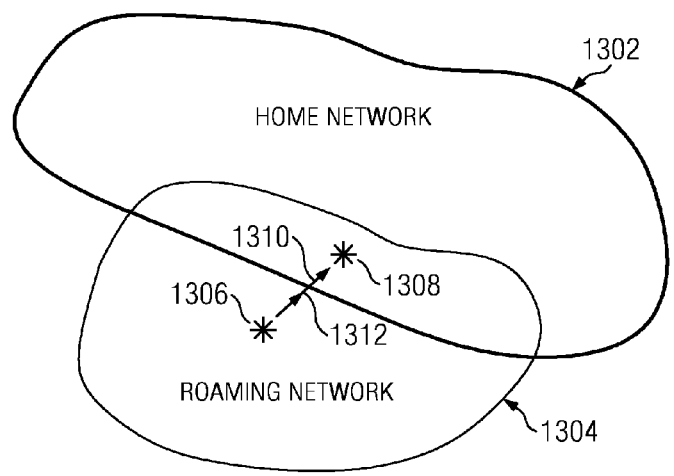
FIG. 13 illustrates a situation when a mobile device is moving from a roaming network into its home network.

Referring now to FIG. 13, there is illustrated an alternative embodiment of the present disclosure wherein a location of a mobile device 402 is used to disconnect a roaming call when the home network 302 of the mobile device 402 becomes available. The mobile device 402 operates within an area including its home network 1302 and a roaming network 1304. The mobile device 402 is currently moving from a position indicated generally at 1306 residing solely within the roaming network 1304 to a position 1308 residing within an overlapping region of the roaming network 1304 and the home network 1302. In conventional operation, the mobile device 402 would remain connected to the roaming network 1304 as it passes from point 1306 to point 1308 along line 1310 as it remains completely within the roaming network 1304 along the entire movement from point 1306 to point 1308. However, at point 1312 the mobile device passes across the boundary of the home network 1302 and moves into an overlapping area of the home network 1302 and roaming network 1304. In order to minimize the roaming costs associated with mobile device 402, once the location of the mobile device 402 is determined to have moved into an area encompassed by the home network geographic boundaries, the mobile device 402 can be disconnected from the roaming network 1304 to minimize these roaming charges. Alternatively, the mobile device 402 could be handed off from the roaming network 1304 to the home network 1302 to minimize the roaming charges.

Figure 14:
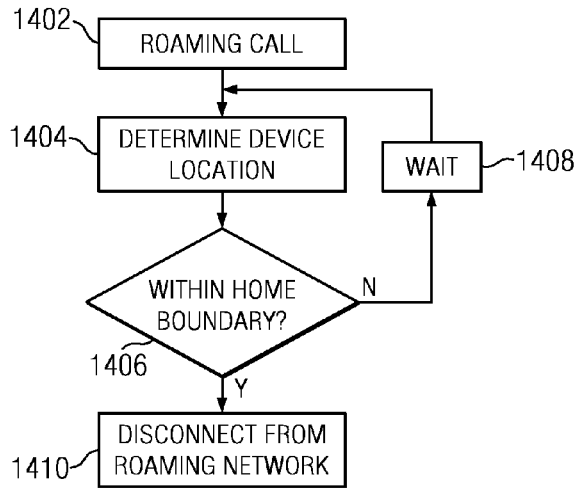
FIG. 14 is a flow diagram the manner of operation of the mobile device when it enters its home network from a roaming network.

Referring now also to FIG. 14, there is illustrated a flow diagram describing the operation for disconnecting a mobile device 402 from a roaming network 1304 when it passes into the geographic boundaries of the home network 1302. When a roaming call occurs at step 1402, the mobile device 402 periodically determines the location of the mobile device 402 at step 1404. Inquiry step 1406 determines whether the mobile device 402 is located within the boundaries of the home network. If not within the boundaries, control passes to step 1408 and the mobile device waits for a predetermined period of time before again determining the device location at step 1404. If inquiry step 1406 determines that the mobile device is now within the geographic boundaries of the home network, the mobile device 402 is disconnected from the roaming network at step 1410. The disconnection may take the form of merely dropping the call presently being provided via the roaming network, or alternatively, may be implemented via a handoff from the roaming network to the home network.

Figure 15:
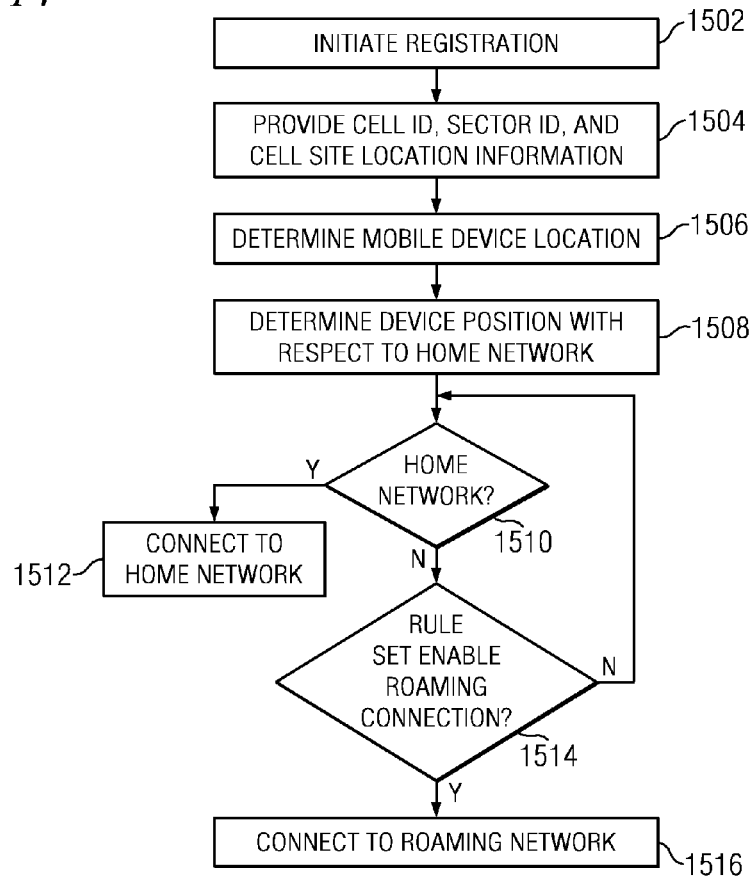
FIG. 15 is a flow diagram describing the biasing of a connection of the mobile device to its home network wherein the decisions are made on the network rather than the mobile device side.

Referring now to FIG. 15, there is illustrated a flow diagram describing a process wherein rather than positioning the mobile device 402 and determining whether the mobile device is within the home network boundaries within the mobile device 402, the positioning decisions and home network decisions are made at the network side. Thus, for example, when a handset registers with either a home network or via a roaming network while on the roaming partner's network, information is transmitted back to the home network provider to make the positioning and registration determinations. The control logic for selecting, positioning and controlling can be embedded within any one particular network component or can be distributed throughout the architecture of any one or all of (1) the mobile device, (2) the requesting network, (3) the home network or (4) an attached server.

When a registration is initiated at step 1502, the cell ID that the mobile device 402 is presently connected with, the sector ID that the mobile device 402 is presently connected with and location information related to the mobile device 402 is transmitted from the mobile device back to the network serving the mobile device at step 1504. The actual position of the mobile device 402 may also be determined based upon extra messaging initiated by the network in order to locate the mobile device's 402 position via GPS and/or terrestrial methods at step 1506. The network determines the device position with respect to the home network boundaries at step 1508. The boundary maps would be stored on the network side rather than at the mobile device 402 as discussed previously. Inquiry step 1510 determines whether the mobile device 402 can connect with its home network 302. If the mobile device 402 may connect with its home network 302, it does so at step 1512. If inquiry step 1510 determines that the mobile device 402 is not presently able to connect with the home network, control passes to inquiry step 1514 which accesses the associated rule sets on the network side to determine if the mobile device 402 may be enabled to attempt a roaming connection. If the mobile device 402 is not presently allowed to attempt a roaming connection, control passes back to inquiry step 1501 to again attempt a home network connection. Repeated home network connection attempts are carried out until the rule set enables the mobile device 402 to connect with a roaming network 304 at step 1516. The rule set accesses at inquiry step 1514 bias the mobile device 402 to connect with the home network 302 for a predetermined number of times or for a predetermined duration of time as described previously hereinabove using the above-described method, the decisions made as to whether the mobile device 402 resides within the home network 302 and the decisions made based upon the rule sets biasing the connection of the mobile device 402 to the home network 302 are all made upon the network side of the system rather than at the mobile device 402 as described in previous examples. These rule sets may reside wholly or particularly within any combination of (1) the mobile device, (2) a requesting network, (3) a home network or (4) an attached server.

Referring now to FIG. 16, there is illustrated a home network 1602 and first and second overlapping roaming networks 1604 and 1606. The home network 1606 additionally includes a number of coverage holes 1608 included throughout the home network 1602. Each of these coverage holes 1608 comprise areas wherein for one reason or another, home network coverage for mobile devices is either permanently or periodically unavailable to a mobile device within the home network 1602. When within the coverage holes 1608, the mobile device has the option of connecting with one of the roaming networks 1604 and 1606. Alternatively, in the case of a coverage hole 1608 that is only periodically present or only present for short periods of time with respect to a moving mobile device, particular rule sets can be implemented for particular coverage holes 1608 in order to provide a most likely opportunity for connecting with the home network 1602 or a most advantageous roaming network. This is achieved by associating particular unique rule sets with each individual coverage hole 1608.

These rule sets and coverage hole locations may be either stored within the mobile device as illustrated in FIG. 17*a* or within the home location register of the mobile device as illustrated in FIG. 17*b* or another network based server. For the mobile device located rule set, the mobile device 1702 includes the storage location 1704 in which each of the various coverage holes are stored. Indexed with each of the coverage holes are a particular rule set that is unique to and associated with the particular coverage hole. This will allow the mobile device 1702 to interact when it is within a particular coverage hole in a manner that is defined by the associated rule set. In the alternative configuration, the HLR 1706 stores the coverage hole information and indexed rule sets that are associated with a particular coverage hole within a storage area 1708 within the HLR.

Figure 18:
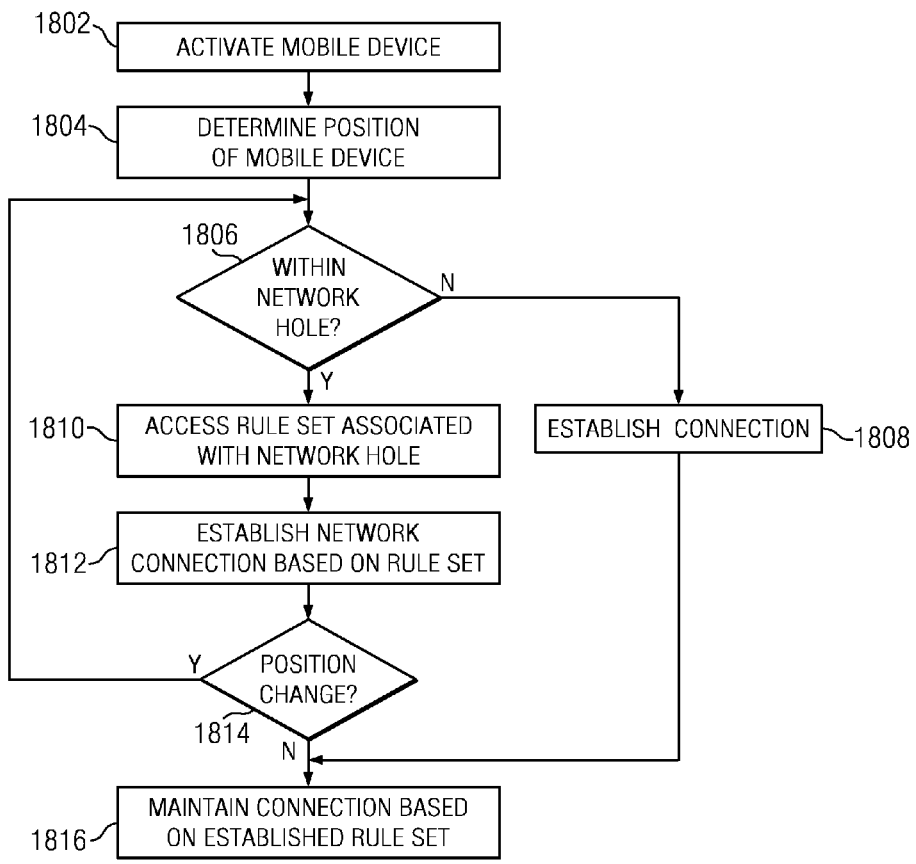
FIG. 18 is a flow diagram illustrating the operation of a mobile device having various rule sets associated with holes within its home network.

Referring now to FIG. 18, there is illustrated a flow diagram describing the operation of a mobile device operating according to various rule sets associated with particular network coverage holes. Once a mobile device is activated at step 1802, the position of the mobile device is determined at step 1804. The determination of the position of the mobile device may be made in any number of fashions. As described earlier, the mobile device position may be based upon GPS capabilities within the mobile device or within the associated network. Additionally, use may be made of the cell ID associated with the mobile device. The cell ID can be used to identify particular coverage hole areas that have been located within a particular network. Thus, if the mobile device is receiving the cell ID associated with a coverage area hole, the device is assumed to be located within this coverage area hole.

Inquiry step 1806 determines, based upon either the GPS positioning information of the mobile device or the cell identification information received by the mobile device, whether the mobile device is currently within a network hole. If the device is not determined to be within a network hole, a network connection is established at step 1808 in accordance with normal network connection rules and may utilize the location-based network connection processes described hereinabove. If inquiry step 1806 determines that the mobile device is currently located within the network hole, the particular rule set associated with that network hole is accessed at step 1810. As described previously with respect to FIGS. 17a and 17b, this rule set may be located within the mobile device or alternatively, can be associated with the network side of the system in for example, the home location network. After accessing the particular rule set, a network connection is established at step 1812 based upon the accessed rule set for the mobile device.

Inquiry step 1814 determines whether there has been a position change for the mobile device. If so, control passes back to inquiry step 1806 and a further determination is made if the mobile device resides within a network hole. If inquiry step 1814 determines that there is no position change by the mobile station, the network connection based upon the established rule set is maintained at step 1816.

Figure 19:
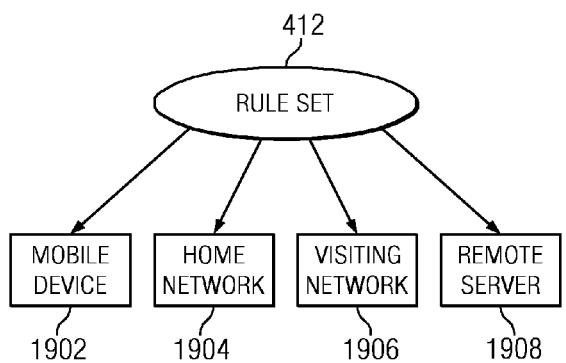
FIG. 19 illustrates the manner in which a rule set can be implemented individually within or across multiple components of a network.

Referring now to FIG. 19, there is illustrated the manner in which the rule set 412 by which the selection, provisioning and control of the manner in which a mobile device is connected with an associated home or roaming network, connected with one of multiple types of wireless networks or the mobile device's connection control with respect to holes within a network may be implemented. The rule set 412 may be stored either singly within a mobile device 1902, a particular component of the home network 1904, a particular component of a visiting network 1906 or some other remote server 1908 associated with the wireless communications network. Rather than implementing the rule set 412 individually within any of the described components, various parts of the rule set may be distributed across each of or any combination of the mobile device 1902, home network 1904, visitor network 1906 and remote server 1908. Alternatively, the rule set 412 could also be distributed across any one of the home network 1904 and the visiting network 1906 such that the rule set was stored at different locations within either of the home network 1904 and visiting network 1906. This provides a great deal of flexibility in implementing the rule set 412 as the rule set in any functionalities for implementing the rule set may be distributed across all of the components of the wireless communication system providing a number of fashions for implementing the manner for connecting the wireless device with a selected wireless network.

The rule set 412 includes rules and information controlling the manner in which the mobile device may connect with an associated home or roaming network or with a type of wireless network. As described hereinabove, the rule set may establish rules based upon the location of the mobile device with respect to the geographic boundaries of a home, roaming or type of wireless network. Alternatively, the rule set may establish the basis for connection based upon listings of acceptable or unacceptable cell sites that are included with the rule set. These acceptable or unacceptable cell sites may be based upon the geographic location of these cell sites with respect to particular networks with which the mobile device is attempting to connect or alternatively could be based upon the type of wireless network connection provided by the cell site.

Thus, using the above-described system and method a home network provider is able to optimize network selection of their handsets based upon the geographical location of their handset with respect to their home network. This provides better control over the specific network that the handset acquires within a given geographic area even if multiple networks are overlapping a location from which the mobile device is presently attempting a network access. The mobile device is biased to connect to a particular network that most generally benefits the home network service provider or the user of the mobile device depending upon the charging scheme implemented with respect to the mobile device. This will prevent situations wherein a mobile device is accessing a roaming network in an area served by the mobile device's home network due to regions within the home coverage that have inadequate signal strength or other type of signal limiting situations.

It will be appreciated by those skilled in the art having the benefit of this disclosure that this location-based network selection method for a mobile device provides an improved network connection method to limit roaming charges. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for connecting a mobile device with one of a plurality of wireless networks, comprising the steps of:
   initiating a network selection process for the mobile device with one of the plurality of overlapping wireless networks when the mobile device is located within an overlapping area of at least a home network and a roaming network of the plurality of overlapping wireless networks;

determining a geographic position of the mobile device with respect to at least one of the plurality of overlapping wireless networks;

determining if the mobile device is within a hole of the at least one of the plurality of overlapping wireless networks;

establishing a connection to one of the plurality of overlapping wireless networks in accordance with a hole rule set associated with the hole responsive to a determination that the mobile device is within the hole of the at least one of the plurality of overlapping wireless networks;

attempting, responsive to the determined geographic position of the mobile device, to connect with the home network of the plurality of overlapping wireless networks a predetermined plurality of times before trying to connect with the roaming network of the plurality of networks in accordance with a rule set that biases the connection of the wireless device to the home network when the mobile device is located within the overlapping area of the home network and the roaming network; and connecting with the roaming network of the plurality of overlapping wireless networks if connection with the home network fails after attempting to connect with the home network in accordance with the rule set.

2. The method of claim 1, wherein the step of determining the geographic position further comprises the step of:

accessing a boundary map defining a geographic boundary of the at least one of the plurality of wireless networks;

determining a geographic position of the mobile device; and determining if the geographic position of the mobile device lies within the geographic boundary of the at least one of the plurality of wireless networks.

3. The method of claim 2, wherein the step of determining the geographic position further comprises the step of GPS positioning the mobile device.

4. The method of claim 2, wherein the step of determining the geographic position further comprises the steps of:

identifying the geographic position of a cell communicating with the mobile device; and establishing the geographic location of the mobile device as the geographic location of the cell communicating with the mobile device.

5. The method of claim 2, further including the step of periodically updating the boundary map defining the geographic boundary of the at least one of the plurality of wireless networks.

6. The method of claim 5, wherein the step of periodically updating further comprises the step of wirelessly transmitting an updated boundary map to the wireless device.

7. The method of claim 1 further including the steps of:

determining a subsequent geographic position of the wireless device connected to the roaming network of the plurality of wireless networks with respect to the home network of the plurality of wireless networks; and disconnecting the wireless device from the roaming network when the determination is made that the geographic location of the wireless device is within the home network of the plurality of wireless networks.

8. A method for connecting a mobile device with a home network or at least one roaming network, comprising the steps of:

initiating a registration of the mobile device with either the home network or the at least one roaming network when the mobile device is located within an overlapping area of the home network and the at least one roaming network;

accessing a boundary map defining a geographic boundary of the home network;

determining a geographic position of the mobile device;

determining if the geographic position of the mobile device lies within the geographic boundary of the home network;

determining if the mobile device lies within a hole of the home network;

establishing a connection to the home network in accordance with a hole rule set associated with the hole responsive to a determination that the mobile device is within the hole of the home network;

attempting to connect with the home network for a predetermined duration of time before trying to connect with the at least one roaming network in accordance with a rule set that biases the connection of the wireless device to the home network when the mobile device is located within the overlapping area of the home network and the roaming network responsive to a determination that the geographic position of the mobile device lies within the boundaries of the home network; and connecting with at least one roaming network if connection with the home network fails after attempting to connect with the home network in accordance with the rule set.

9. The method of claim 8, wherein the step of determining the geographic position further comprises the step of GPS positioning the mobile device.

10. The method of claim 8, wherein the step of determining the geographic position further comprises the steps of:

identifying the geographic position of a cell communicating with the mobile device; and establishing the geographic location of the mobile device as the geographic location of the cell communicating with the mobile device.

11. The method of claim 8, further including the step of periodically updating the boundary map defining the geographic boundary of the home network.

12. The method of claim 8, wherein the step of attempting further includes the step of providing customized application behavior for the mobile device responsive to the determined geographic position of the mobile device with respect to the home network and a type of an application attempting to access the home network.

13. A system for connecting a mobile device with one of a plurality of wireless networks, comprising:

at least one boundary map stored within the system defining a geographic boundary of a home network and a plurality of holes in the home network;

geographic positioning circuitry for determining a geographic position of the mobile device;

at least one first rule set associated with the mobile device for controlling connection of the mobile device with the one of the plurality of wireless networks when the mobile device is located within an overlapping area of the home network and a roaming network of the plurality of wireless networks;

a second rule set associated with the mobile device for controlling connection of the mobile device with the home network when the mobile device is located within a hole within the home network;

wherein the second rule set controls connection of the mobile device with the home network of the plurality of wireless networks when the mobile device is located within the hole of the home network;

wherein the at least one first rule set biases connection of the mobile device with the home network of the plurality of wireless networks when the mobile device is located within the overlapping area of the home network and the roaming network responsive to the determination that the geographic position of the mobile device is within the at least one boundary map of the home network;

wherein the at least one first rule set configures the mobile device to attempt to connect with the home network for a predetermined period of time before trying to connect with the roaming network; and further wherein the at least one first rule set configures the mobile device to connect with the roaming network if connection with the home network fails according to the at least one first rule set.

14. The system of claim 13, wherein the at least one first rule set and the second rule set are located within the mobile device.

15. The mobile device of claim 13, wherein the at least one first rule set and the second rule set are located within the home network of the mobile device.

* * * * *